(12) United States Patent
Lin

(10) Patent No.: US 12,093,439 B2
(45) Date of Patent: Sep. 17, 2024

(54) TWO IMAGE FACIAL ACTION DETECTION

(71) Applicant: Hewlett-Packard Development Company, L.P., Spring, TX (US)

(72) Inventor: Qian Lin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 185 days.

(21) Appl. No.: 17/431,757

(22) PCT Filed: Jun. 27, 2019

(86) PCT No.: PCT/US2019/039508
§ 371 (c)(1),
(2) Date: Aug. 18, 2021

(87) PCT Pub. No.: WO2020/263261
PCT Pub. Date: Dec. 30, 2020

(65) Prior Publication Data
US 2022/0122379 A1    Apr. 21, 2022

(51) Int. Cl.
*H04N 23/80* (2023.01)
*G06F 3/01* (2006.01)
(Continued)

(52) U.S. Cl.
CPC ............... *G06F 3/011* (2013.01); *G06T 3/40* (2013.01); *G06T 7/11* (2017.01); *G06V 10/803* (2022.01);
(Continued)

(58) Field of Classification Search
CPC ... G06F 3/011; G06T 7/11; G06T 3/40; G06T 2207/20132; G06T 2207/30201; G06V 40/174; G06V 40/171; G06V 40/165; G06V 10/803; G06V 40/176; G06V 40/166; H04N 23/80; H04N 23/90
(Continued)

(56) References Cited

U.S. PATENT DOCUMENTS 10,089,522 B2   10/2018   Yu et al.
10,143,414 B2   12/2018   el Kaliouby et al.
(Continued)

FOREIGN PATENT DOCUMENTS

KR   20170135758      12/2017
WO   WO-2018128996 A1   7/2018

OTHER PUBLICATIONS

Song, Guoxian et al., "Real-time 3D Face-Eye Performance Capture of a Person Wearing VR Headset", Oct. 22-26, 2018. In 2018 ACM Multimedia Conference (MM '18). 9 pages.

*Primary Examiner* — Trang U Tran
(74) *Attorney, Agent, or Firm* — Quarles & Brady LLP

(57) ABSTRACT

An example system includes a first camera to capture a first image of a first facial body part and a second camera to capture a second image of a second facial body part. The example system further includes a transformation engine to transform respective scales of the first image and the second image to a scale of full facial images. The example system further includes a local location engine to: identify first facial landmarks and second facial landmarks in respective transformed versions of the first image and the second image, the first facial landmarks and the second facial landmarks used to determine that an action has occurred.

19 Claims, 5 Drawing Sheets

(51) Int. Cl.
*G06T 3/40* (2006.01)
*G06T 7/11* (2017.01)
*G06V 10/80* (2022.01)
*G06V 40/16* (2022.01)
*H04N 23/90* (2023.01)

(52) U.S. Cl.
CPC .......... *G06V 40/165* (2022.01); *G06V 40/166* (2022.01); *G06V 40/171* (2022.01); *G06V 40/174* (2022.01); *G06V 40/176* (2022.01); *H04N 23/80* (2023.01); *H04N 23/90* (2023.01); *G06T 2207/20132* (2013.01); *G06T 2207/30201* (2013.01)

(58) Field of Classification Search
USPC ........................................................ 348/77
See application file for complete search history.

(56) References Cited

U.S. PATENT DOCUMENTS

| | | | |
|---|---|---|---|
| 10,165,949 | B2 | 1/2019 | Tzvieli et al. |
| 10,949,649 | B2* | 3/2021 | Walker ................. G06F 18/214 |
| 2017/0098122 | A1 | 4/2017 | el Kaliouby et al. |
| 2017/0330029 | A1 | 11/2017 | Turcot et al. |
| 2017/0352183 | A1 | 12/2017 | Katz et al. |
| 2019/0012528 | A1 | 1/2019 | Wilson et al. |
| 2019/0029528 | A1 | 1/2019 | Tzvieli et al. |
| 2019/0251335 | A1* | 8/2019 | Han ..................... G06V 40/166 |
| 2020/0020173 | A1* | 1/2020 | Sharif ..................... G06T 19/20 |

\* cited by examiner

Figure 5

TWO IMAGE FACIAL ACTION DETECTION

BACKGROUND

Augmented reality and/or virtual reality glasses, and the like, are becoming more ubiquitous. Detecting facial expressions using cameras in augmented reality glasses can be challenging as facial expressions are usually based on an image of a face, and the glasses generally obscure the face.

BRIEF DESCRIPTION OF THE DRAWINGS

Reference will now be made, by way of example only, to the accompanying drawings in which:

FIG. 5 is a diagram of an example set of landmarks for an example face.

DETAILED DESCRIPTION

Figure 1:
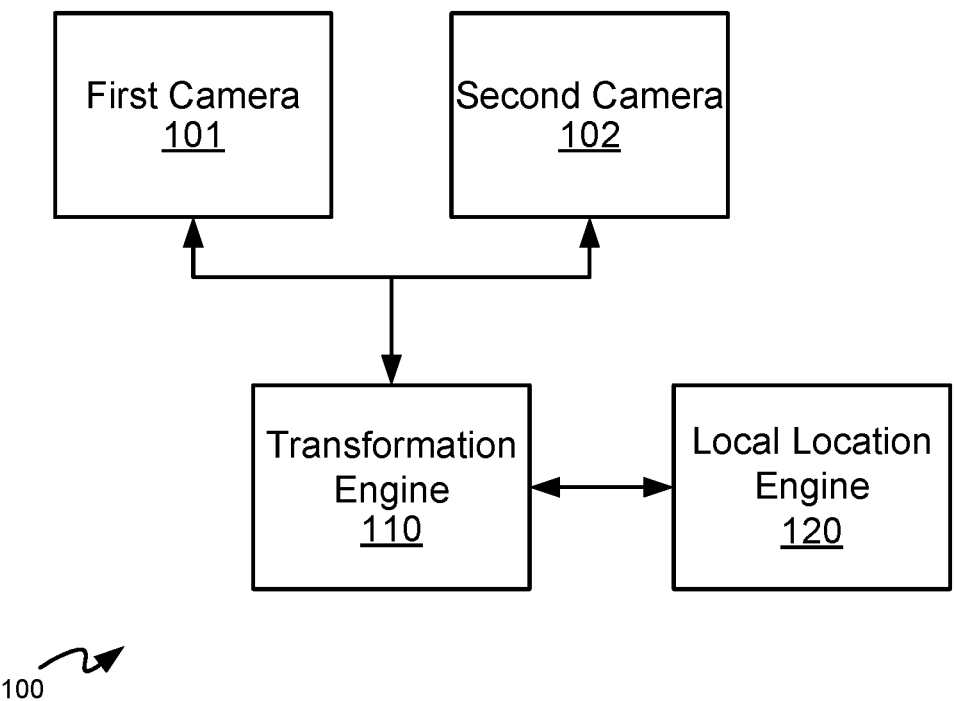
FIG. 1 is a block diagram of an example system to implement two image facial detection.

Augmented reality and/or virtual reality glasses, and the like, are becoming more ubiquitous. Detecting facial expressions using cameras attached to, and/or incorporated into, augmented reality glasses and/or virtual reality devices can be challenging as facial expressions are usually based on an image of a face, and the glasses generally obscure the face. Indeed, when a user is engaged in an augmented reality environment and/or a virtual reality environment, it may be desirable to determine the emotional state and/or facial expression of the user for analytics, and in particular use the emotional state and/or facial expression in the augmented reality environment and/or a virtual reality environment.

In particular, the information contained in facial expressions may be very useful. For example, the facial expression may indicate an emotional state of that person. Hence, the terms facial expression and emotion may be used interchangeably hereafter. Further, the facial expression may supplement or even entirely change the meaning of a verbal communication received from the person. The facial expression may indicate an amount of pain being experienced by the person or a mental condition of the person (e.g., whether the person is suffering from a mental disorder or a disease that affects the brain). The facial expression may indicate whether the person is lying. Thus, a facial expression may be used by an autonomous system or application to determine an emotional state of a person interacting with the autonomous system or the application. Medical systems or applications may use a facial expression to determine the amount of pain being experienced by a patient or to diagnose the patient. Law enforcement systems or applications may use a facial expression to determine the truthfulness of suspects or witnesses.

Facial expressions may be made up of facial action units. As used herein, the term "facial action unit" refers to the movement of a facial muscle that produces a change in facial appearance. In an example, the facial action units may be classified according to the Facial Action Coding System, which is a taxonomy of facial action units according to the change in facial appearance that is produced. The facial expression of the user may be determined by detecting which facial action units have occurred.

In some examples, capturing a user's facial expressions can be used to control an avatar in a virtual reality environment. However, when a user is wearing augmented reality and/or virtual reality glasses, and the like, getting a complete facial image becomes a challenge and/or is not possible as the glasses generally obscure portions of the user's face.

Hence, provided herein is a system comprising: a first camera to capture a first image of a first facial body part; a second camera to capture a second image of a second facial body part; a transformation engine to transform respective scales of the first image and the second image to a scale of full facial images; and a local location engine to: identify first facial landmarks and second facial landmarks in respective transformed versions of the first image and the second image, the first facial landmarks and the second facial landmarks used to determine that an action has occurred.

For example, the cameras may be components of augmented reality and/or virtual reality glasses, with one of the cameras located to acquire images of an eye of a user wearing the glasses, and the other of the cameras located to acquire images of a mouth of the user wearing the glasses. While the term "glasses" is used throughout the present specification, the term "glasses" may refer to any suitable headset worn by a user in which images are viewed by the user; such glasses and/or headsets include, but are not limited to, augmented reality headsets, virtual reality headsets, and the like.

Accordingly, the first facial landmarks and the second facial landmarks may respectively be facial landmarks of the eye of the user and facial landmarks of the mouth of the user. When the first facial landmarks and the second facial landmarks are identified, and transformed to respective scales of full facial images, the first facial landmarks and the second facial landmarks may be used to determine an action of the eye and/or the mouth, which may be used to determine an emotion and/or facial expression associated with the first facial body part (e.g. the eye) and the second facial body part (e.g. the mouth). A determined emotion and/or facial expression may be used as input to an application, such as an augmented reality application and/or a virtual reality application, to control the application accordingly, and/or to determine how the user is responding to the content displayed by the augmented reality and/or the virtual reality devices.

In particular, the transformation engine and the local location engine are generally implemented by a computing device, for example a computing device of the glasses and/or another computing device in communication with the glasses.

The various operations of the transformation engine and the local location engine may generally depend on identifying the locations of facial landmarks in the images from the cameras. As used herein, the terms "determining a facial landmark" or "identifying a facial landmark" refer to determining or identifying a location of that facial landmark. While examples described herein use eyes and the mouth as example facial landmarks, facial landmarks herein may correspond to any suitable body parts of the face, such as eyebrows, eyes, nose, mouth, facial contour, or the like. There may be multiple facial landmarks for each body part. For example, a plurality of landmarks may circumscribe each body part.

Furthermore, the term "glasses" as referred to herein refer to augmented reality and/or virtual reality glasses, and the like, and/or any glasses that includes a first camera and a second camera that capture respective images of a first facial body part and a second facial body part.

Furthermore, while examples described herein refer to using a determined emotion and/or facial expression associated with the first facial body part (e.g. the eye) and the second facial body part as input to an augmented reality application and/or a virtual reality application, a computing device implementing the various operations of the transformation engine and the local location engine may identify the plurality of landmarks and use the plurality of landmarks as an input to a face tracking operation, a facial recognition operation, an emotion recognition operation, a facial modification operation, or the like. In an example, the computing device may use a neural network, such as a convolutional neural network, to identify the locations of the facial landmarks.

In an example, the neural network may include numerous layers to improve the accuracy of the identification of facial landmark locations including, but not limited to, a convolutional layer, a pooling layer, a fully connected layer and/or a plurality of each type of layer. However, such a neural network may be unable to identify the locations of the facial landmarks in real time. For example, a mobile device, such as augmented reality and/or virtual reality glasses, with limited processing capabilities may be unable to use such a neural network to identify the locations of the facial landmarks in image frames of a video in real-time with the capturing of those image frames (e.g., in a time less than or equal to the period between the capturing of the image frames).

Accordingly, in some examples, multiple smaller neural networks may be used herein to identify locations of the facial landmarks. Using multiple smaller neural networks to identify the locations of the facial landmarks may provide real-time performance while maintaining an acceptable level of accuracy. For example, a plurality of neural networks may determine the locations of facial landmarks for particular facial body parts based on respective images of those body parts as acquired by the respective cameras described herein.

Neural networks as described herein may include numerous layers to improve the accuracy of the identification of facial landmark locations including, but not limited to, a convolutional layer, a pooling layer, a fully connected layer and/or a plurality of each type of layer. Furthermore, neural networks as described herein may include a Visual Geometry Group (VGG) style network structure. Furthermore, machine learning models as described herein may be trained to perform described functionality by training a support vector machine (SVM), and the like. However, functionality as described herein may be implemented with any suitable machine learning model, neural network, deep learning model, and the like.

Furthermore, as the images captured by the cameras will generally be at different scales than full facial images, for example different sizes, different perspectives, and the like, even the multiple smaller neural networks may encounter challenges identifying the locations of the facial landmarks in the images. For example, neural networks may be trained to determine locations of facial landmarks using full facial images, for example using a camera and/or cameras to acquire images of an entirety of a user face and/or users' faces. However, the images captured by the cameras as described herein may show eyes, mouths, etc. at different sizes and/or different perspectives and/or angles then the images used to train the neural networks. As such, the computing device implementing the transformation engine transforms respective scales of the first image and the second image to a scale of full facial images, which may include changing size of the first image and/or the second image. For example, the transformation engine may transform respective scales of the first image and the second image to a scale of full facial images relative to full facial images, so that the body parts in the first image and the second image are similar relative sizes as the corresponding body parts in the full facial images. Similarly, the transformation engine may transform respective scales of the first image and the second image to a scale of full facial images, so that the body parts in the first image and the second image are at a similar perspective as the full facial images.

FIG. 1 is a block diagram of an example system 100 to implement two image facial detection. The system 100 may include a first camera 101, a second camera 102, a transformation engine 110 and a local location engine 120. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. For example, the first camera 101, the second camera 102, the transformation engine 110 and the local location engine 120 may be components of augmented reality glasses and/or virtual reality glasses, and the like, with the transformation engine 110 and the local location engine 120 being implemented and/or executed and/or components of a computing device of the glasses. Alternatively, the first camera 101, the second camera 102 may be components of the glasses, in communication with a computing device that includes the transformation engine 110 and the local location engine 120 as components, and the like.

The first camera 101 may capture a first image of a first facial body part, for example an eye of a user wearing glasses of which the first camera 101 is a component. In some examples, the first camera 101 may include two cameras that acquire respective images of a left eye of the user and a right eye of the user.

Similarly, the second camera 102 may capture a second image of a second facial body part, for example a mouth of a user wearing the glasses of which the second camera 102 is a component.

The images captured by the first camera 101 and the second camera 102 may be still frames or may be image frames in a video and/or a stream of image frames.

The transformation engine 110 generally transforms respective scales of the first image and the second image to a scale of full facial images. For example, the transformation engine 110 may generate and/or include, and/or have access to, a transformation matrix and/or transformation matrices to transform the respective scales of the first image and the second image to the scale of the full facial images when the transformation matrix and/or transformation matrices are applied to the first image and the second image. The transformation matrix may be generated by the transformation engine 110 and/or the transformation engine 110 may have access to a previously generated transformation matrix.

The full facial images may be "normalized" facial images of a pre-specified face size, such as 128×128 pixels, and with facial parts at pre-specified locations, such as the center of the eyes located at one third of the distance from a top of a facial image, and a tip of the nose is located at half of a distance from the top of the facial image.

In some examples, a different transformation matrix may be used for each of left eye images, right eye images and mouth images. While one transformation matrix is referred to hereafter, it is understood that such a transformation matrix may include any suitable number of transformation matrixes.

For example, such a transformation matrix may comprise a matrix of values such that, when pixel values of the images acquired by the cameras 101, 102 are multiplied by the transformation matrix, the images are respectively transformed to a scale of the full facial images.

For example, the transformation engine 110, or another engine (e.g. a matrix engine, not depicted) of the system 100, may be to: determine facial landmarks in a collection of full facial images acquired using at least a third camera, for example a camera positioned to acquire full facial images of users; receive manual indications of respective facial landmarks in a collection of images of the first facial body part and the second facial body part, the respective facial landmarks corresponding to the facial landmarks of the first facial body part and the second facial body part in the full facial images; compare the facial landmarks and the respective facial landmarks to determine a transformation matrix there between; and transform the respective scales of the first image and the second image to the scale of the full facial images using the transformation matrix. In some examples, the facial landmarks for the full facial images are identified (e.g. the manual indications of respective facial landmarks are received) after the full facial images are normalized, for example to 128×128 pixels, etc., as described above. Hence, the transform of the respective scales of the first image and the second image to the scale of the full facial images using the transformation matrix may generally align the first image and the second image to the normalized full facial image.

For example, the transformation engine 110, or another engine of the system 100 (e.g. a matrix engine, not depicted) may have access to a database, and/or databases and the like, that stores a collection of full facial images acquired using a camera and/or cameras positioned to acquire full facial images of users. The database and/or databases may further store a collection of images of the first facial body part and the second facial body part, for example a collection of images of eyes (e.g. left eyes and right eyes) and mouths that are acquired with cameras in similar locations as the first camera 101 and the second camera 102.

In some examples, the collection of images of the first facial body part and the second facial body part may be acquired using the glasses of which the first camera 101 and the second camera 102 are components, and/or similar glasses (e.g. glasses in a same and/or similar product line as the glasses of which the first camera 101 and the second camera 102 are components).

In some of these examples, the transformation engine 110, or another engine (not depicted) of the system 100, and the like, may automatically annotate the full facial images to locate landmarks of at least the first facial body part and the second facial body part (e.g. the eyes and/or mouths) in the collection of full facial images; alternatively, a user and/or users may manually annotate the full facial images to locate landmarks of first facial body part and the second facial body part (e.g. the eyes and/or mouths) in the collection of full facial images. In some examples, landmarks of more than just the first facial body part and the second facial body part may be located. For example, in some examples sixty-eight (e.g. "68") facial landmarks may be located including landmarks of the first facial body part and the second facial body part.

Figure 5:
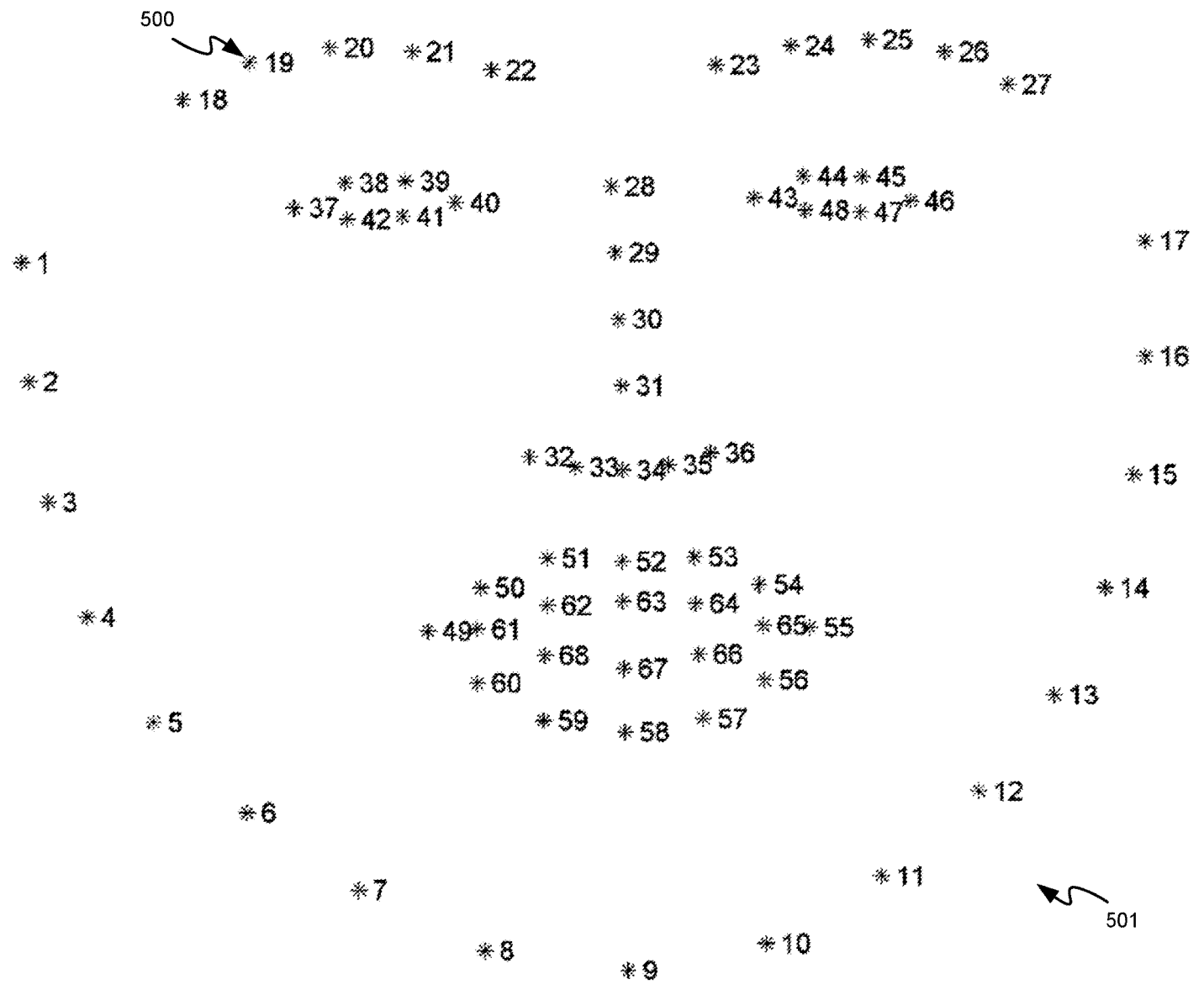

For example, with brief reference to FIG. 5, a diagram of an example set of landmarks 500 for an example face 501 is depicted. While the set of landmarks 500 include sixty-eight ("68") landmarks, any suitable number of landmarks and/or any suitable set of landmarks may be used and/or determined by the landmark detection engine. The landmarks in the example set of landmarks 500 may be identified based on the number indicated in FIG. 5. For example, the landmark at the bottom of the chin may be referred to as LM9.

Furthermore, in some examples, as described above the full facial images may be normalized, for example by aligning faces in the full facial images in a region of a given size (e.g. including, but not limited to, a 128 pixel×128 pixel region) so that respective centers of the eyes of the full facial images are located at fixed locations in the region of the given size. Hence, the facial landmarks of the aligned faces in the region of the given size may be for normalized facial images. Put another way, the full facial images may be normalized before facial landmarks of the full facial images are determined. In particular, when neural networks as described herein may generally be trained with normalized face images, the neural networks do not generally work directly with full face images in their original (e.g. non-normalized) resolutions.

Returning to FIG. 1, in some of these examples, the transformation engine 110, or another engine (not depicted) of the system 100, and the like, may automatically annotate the images of the first facial body part and the second facial body part (e.g. the eyes and/or mouths) in the collection of images of the first facial body part and the second facial body part; alternatively, a user and/or users may manually annotate images of the first facial body part and the second facial body part (e.g. the eyes and/or mouths) in the collection of images of the first facial body part and the second facial body part.

Regardless, a transformation matrix may be determined by comparing the full facial images, as annotated, with the collection of images of the first facial body part and the second facial body part, as annotated, for example using a neural network and the like, trained to generate transformation matrices using a collection of full facial images and a collection of images of the first facial body part and the second facial body part, with landmarks annotated therein.

The transformation matrix may include a perspective transformation matrix between the normalized facial landmarks of the collection of full facial images and annotated facial landmarks (whether automatically and/or manually annotated) of the collection of images of the first facial body part and the second facial body part. Alternatively, homographic transformation or other image warping methods can be used.

In other examples, the transformation matrix, and the like, may be determined geometric techniques, for example by determining a difference in perspective and/or scale based on relative positions of the cameras 101, 102, and the like. In other words, the transformation matrix may be determined in any suitable manner.

Regardless of how the transformation matrix is obtained, the transformation engine transforms respective scales of the first image and the second image to a scale of the full facial images.

The local location engine 120, which may include one local location engine and/or more than one location engine (e.g. a local location engine for each of the first facial body part and/or the second facial body part and/or a local location engine for each of the first camera 101 and the second camera 102) is generally to: identify first facial landmarks and second facial landmarks in respective transformed versions of the first image and the second images. For example, the local location engine 120 may comprise a neural network and/or a plurality of neural networks, trained to identify first facial landmarks and second facial landmarks in respective transformed versions of the first image and the second images.

In general, the first facial landmarks and the second facial landmarks may be used to determine that an action has occurred. For example, while FIG. 1 is described with respect to identifying first facial landmarks and second facial landmarks in respective transformed versions of the first image and the second images, the system 100 may be used to identify first facial landmarks and second facial landmarks in respective transformed versions of the first image and the second images in an ongoing manner in respective streams of the first images and the second images, and further use positions of the first facial landmarks and second facial landmarks to determine facial action units in the streams of the first images and the second images, which may be used to determine expression and/or emotion of a face in the images.

For example, while not depicted, the system 100 may include an expression engine for determining from the first facial landmarks and the second facial landmarks, an emotion by comparing first facial landmarks and the second facial landmarks to respective facial landmarks of a neutral face, for example to determine facial action units. For example, the facial landmarks of the eyes and the mouth may be determined to be moving in particular directions and/or with particular movements (e.g. actions of the first facial landmarks and the second facial landmarks may be the landmarks moving in particular directions and/or with particular movements) associated with given emotions. An indication of a given emotion may be used as input to an application such as an augmented reality application and/or a virtual reality application, for example to control an avatar. While not depicted, in some examples, the system 100 may include an action engine used to determine the action which may be used as input to the expression engine and/or to control an application according to the action. Indeed, as described herein, emotions and/or determined emotions may include facial expressions and/or determined facial expressions.

While not depicted, in some examples, the system 100 may include a cropping engine to crop the first image (e.g. a respective transformed version of the first image) around the first facial body part and crop the second image (e.g. a respective transformed version of the second image) around the second facial body part, and respective cropped portions of the first image and the second image may be used by the local location engine 120 to identify the first facial landmarks and the second facial landmarks. The cropping engine, when present, may include a neural network and/or neural networks trained to recognize the first facial body part and/or the second facial body part in images and crop the images around the first facial body part and/or around the second facial body part.

Figure 2:
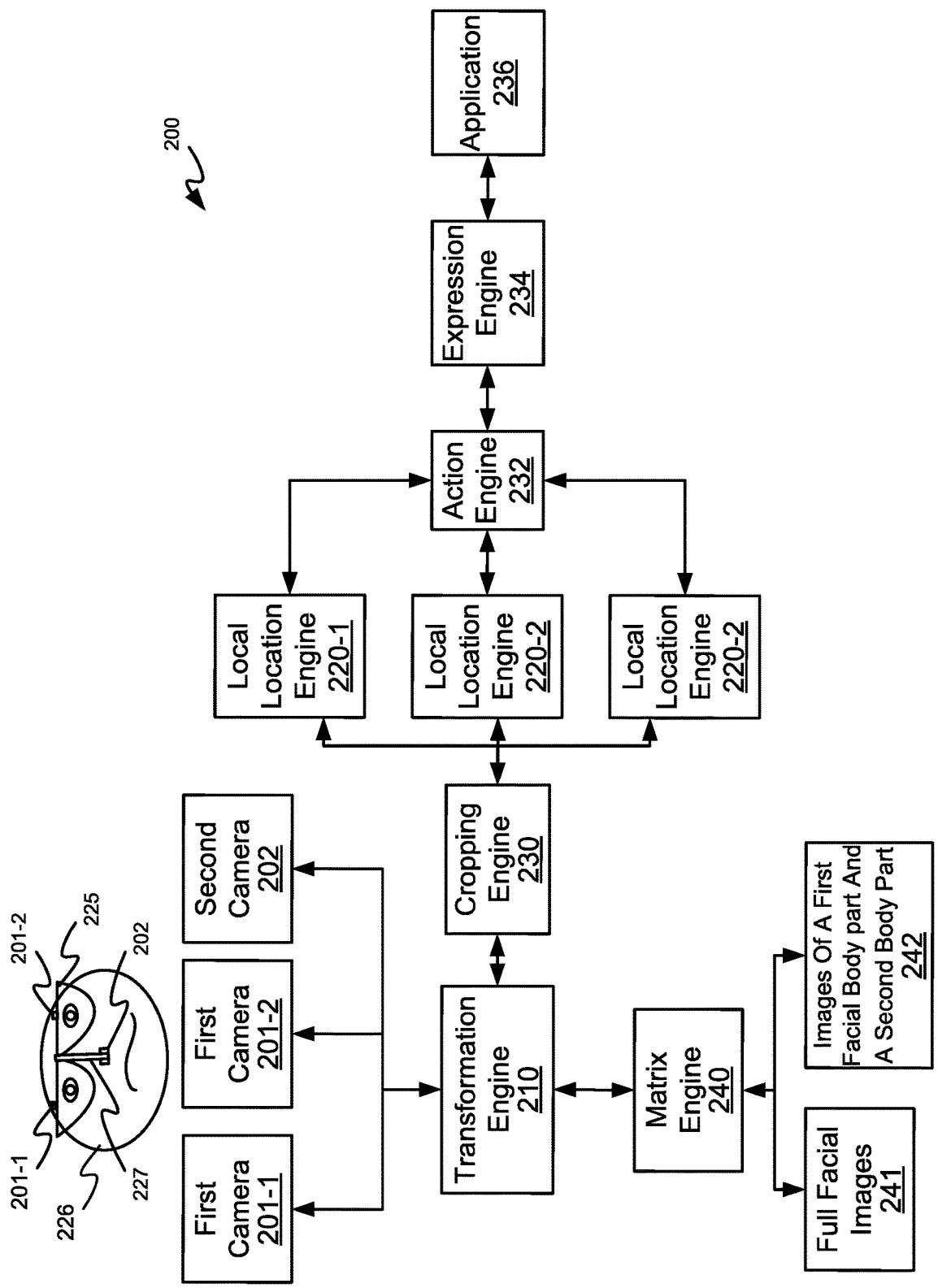
FIG. 2 is a block diagram of another example system to implement two image facial detection.

FIG. 2 is a block diagram of another example system 200 to implement two image facial detection. The system 100 may include first cameras 201-1, 201-2, a second camera 202, a transformation engine 210 and local location engines 220-1, 220-2, 220-3. The first cameras 201-1, 201-2 are interchangeably referred to hereafter, collectively, as the first cameras 201 and, generically, as a first camera 201. Similarly, the local location engines 220-1, 220-2, 220-3 are interchangeably referred to hereafter, collectively, as local location engines 220 and, generically, as a local location engine 220.

The first camera 201, the second camera 202, the transformation engine 210 and the local location engines 220 are each respectively similar to the first camera 101, the second camera 102, the transformation engine 110 and the local location engine 120 as described previously, with similar functionality.

In particular, FIG. 2 further shows the first cameras 201 and the second camera 202 as components of glasses 225 being worn, in the depicted example, by a user 226. The cameras 201 are mounted on the glasses 225 (e.g. at respective eye pieces thereof, and the like) in respective positions to capture respective images of the eyes of the user 226. The camera 202 is mounted on an arm 227 of the glasses 225 that extends from a bridge of the glasses 225 to position the camera 202 to acquire images of the lower facial region of the user 226, including the mouth of the user 226.

While not depicted, the remaining components of the system 200 may be implemented by a processor of the glasses 225 and/or by hardware components of the glasses 225 and/or by any suitable computing device, except as otherwise described.

As depicted the cameras 201, 202 are in communication with the transformation engine 210, and the transformation engine 210 is in communication with the local location engines 220 via a cropping engine 230 which crop first images from the first cameras 201, as transformed by the transformation engine 210, around the first facial body part (e.g. each of the eyes of the user 226) and crops the second image from the second camera 202, as transformed by the transformation engine 210, around the second facial body part (e.g. the mouth of the user 226), the respective cropped portions of the first image and the second image used by the local location engines 220 to identify first facial landmarks (e.g. of each of the eyes of the user 226) and the second facial landmarks (e.g. of the mouth of the user 226).

In particular, a first local location engine 220-1 may be to identify first facial landmarks of a first eye of the user 226 (e.g. a left eye) in respective transformed versions of images from the first camera 201-1, as cropped around the first eye by the cropping engine 230. Similarly, a second local location engine 220-2 may be to identify first facial landmarks of a second eye of the user 226 (e.g. a right eye) in respective transformed versions of images from the second camera 201-2, as cropped around the second eye by the cropping engine 230. Similarly, a third local location engine 220-3 may be to identify second facial landmarks of a mouth of the user 226 in respective transformed versions of images from the second camera 202, as cropped around the mouth by the cropping engine 230. In some examples, a default set of facial landmarks, may be input to the local location engines 220 for reference.

As depicted, the system 200 further comprises an action engine 232 in communication with the location engines 220, the action engine 232 to receive the first facial landmarks and the second facial landmarks as identified by the location engines 220 and determine an action associated therewith. For example, the action engine 232 may receive the first facial landmarks and the second facial landmarks from the location engines 220 and compare the positions of the first facial landmarks and the second facial landmarks to respective facial landmarks of a neutral face (e.g. the action engine 232 may have access to data indicative of respective facial landmarks of a neutral face and/or a face that is in a rest position and/or a neutral position and/or a non-emotive position). Alternatively, the camera 201, 202 may provide a stream of respective images (e.g. as a video stream) to the transformation engine 210 which in turn transforms the images in the stream, which are cropped by the cropping engine 230, and provided to the respective local location engines 220 which determines facial landmarks thereof, which are provided to the action engine 232. The action engine 232 may track positions of facial landmarks from image to image in the stream, and determine an action based on tracking positions of the facial landmarks. Hence, the action engine 232 may determine particular directions of the facial landmarks and/or particular movements of the facial landmarks and generate such an indication of such an action (e.g. an indication that "eyes are closing, and mouth is opening" and the like), for example in the form of facial action units.

For example, the action engine 232 may determine whether a facial action unit occurred based on whether a difference between facial landmarks in the stream of images satisfies a condition. For example, the action engine 232 may determine whether the difference (e.g., the relative difference) exceeds a threshold to determine whether the facial action unit occurred. Each facial action unit may have a corresponding threshold, there may be a single threshold for all facial action units, or there may be a combination of shared and unique thresholds. The threshold and/or thresholds used by the action engine 232 may be a predetermined threshold and/or predetermined thresholds. When a difference determined meets a threshold, a particular facial action unit and/or combination of particular facial action unit may be determined which may indicate that a particular expression and/or emotion may have occurred in a face in the images. However, in other examples, rather than using a threshold to determine a facial action unit, a difference between corresponding landmark point positions, from image to image in the stream of images, may be used determine a facial action unit; in some of these examples, the difference may be used to determine an intensity of a facial action unit which may also indicate that a particular expression and/or emotion may have occurred in a face in the images.

While the functionality of the action engine 232 is described with respect to one engine, the action engine 232 may, in some examples, include three engines: a comparison engine to determine differences between landmarks in a stream of images, a comparison engine to compare the differences to thresholds, and a facial action unit engine to determine whether a facial action unit occurred based on the differences.

As depicted, the system 200 further comprises an expression engine 234 in communication with the action engine 232. The expression engine 234 may receive an indication of an action (e.g. such as a facial action unit) from the action engine 232 and determine, based on the action and/or the indication of the action, an emotion associated with the first facial body part and the second facial body part. For example, the expression engine 234 may associate particular actions with particular emotions, and output an indication of an emotion (e.g. "anger" and the like). In particular, the expression engine 234 may determine an expression of the face based on whether the action engine 232 has determined that a particular plurality of facial action units have occurred and/or whether a particular combination of facial action units have occurred.

In some examples, the action engine 232 and the expression engine 234 may be combined into a single engine. Indeed, in other examples various suitable combinations of the engines of the system 200 may be combined; for example, the transformation engine 210 and the cropping engine 230 may be combined.

Regardless, emotion recognition as performed by the combination of the action engine 232 and the expression engine 234 may be performed by training an SVM of the action engine 232 and/or the expression engine 234 using facial landmarks coordinates (e.g. of previously obtained images) as features.

As depicted, the system 200 further includes an application 236 in communication with the expression engine 234. The application 236 is to receive an indication of an emotion from the expression engine 234 and respond accordingly. For example, the application 236 may comprise a virtual reality application controlling an avatar of the user 226, and the application 236 may control the avatar to express the emotion indicated by the indication of the emotion received from the expression engine 234.

As depicted, the system 200 further comprises a matrix engine 240, a collection 241 of full facial images, and a collection 242 collection of images of the first facial body part and the second facial body part. The collection 241 may be populated using a third camera (e.g. different from the cameras 201, 202) to acquire full facial images of a plurality of users, who may be the same or different from the user 226. The collection 242 may be acquired using the glasses 225, and/or similar glasses (e.g. glasses in a same and/or similar product line as the glasses 225).

The collections 241, 242 may be stored in a memory and/or memories and/or a database and/or databases stored at the memory and/or memories, and may be local or remote to the matrix engine 240. The matrix engine 240 may retrieve the collections 241, 242 and/or respective portions thereof, and determine, from the collections (and/or respective portions thereof), a transformation matrix and/or transformation matrices for transforming respective scales of the first image(s) (e.g. as captured by the first cameras 201) and the second image (e.g. as captured by the second cameras 202) to a scale of full facial images as represented by the collection 241. In some examples, the transforming respective scales including transforming respective perspectives of the first image and the second image to a perspective of full facial images. Furthermore, the matrix engine 240 may normalize the locations of the landmarks in the full facial images of the collection 241, as described above, when determining the transformation matrix and/or transformation matrices.

In contrast to the remainder of the components of the system 200, the matrix engine 240 and the collections 241, 242 may be external to the glasses 225 and/or external to a computing device implementing the other engines of the system 200. For example, the matrix engine 240 and the collections 241, 242 may be at a provisioning device and/or provisioning devices used to provision the system 200 with the transformation matrix and/or transformation matrices. As such, while the matrix engine 240 is depicted as being in communication with the transformation engine 210, such communication may be temporary and/or occur during a provisioning process in which the transformation matrix and/or transformation matrices determined by the matrix engine 240 are provided to the transformation engine 210.

Alternatively, the transformation matrix and/or transformation matrices determined by the matrix engine 240 may be provided to the transformation engine 210 via a memory and/or computing device storing the transformation matrix and/or transformation matrices (e.g. without the matrix engine 240 directly communicating with the transformation engine 210). Alternatively, the functionality of the matrix engine 240 may be combined with the transformation engine 210.

Furthermore, the matrix engine 240 may generate the transformation matrix as a one-time process, and the like, and/or the transformation engine 210 may have access to a previously generated transformation matrix. Indeed, in some examples, the matrix engine 240 and the collections 241, 242) may be optional in the system 200, and/or the matrix engine 240 (as well as the collections 241, 242) may generate the transformation matrix which is made available to, and/or provisioned at, the transformation engine 210.

Figure 3:
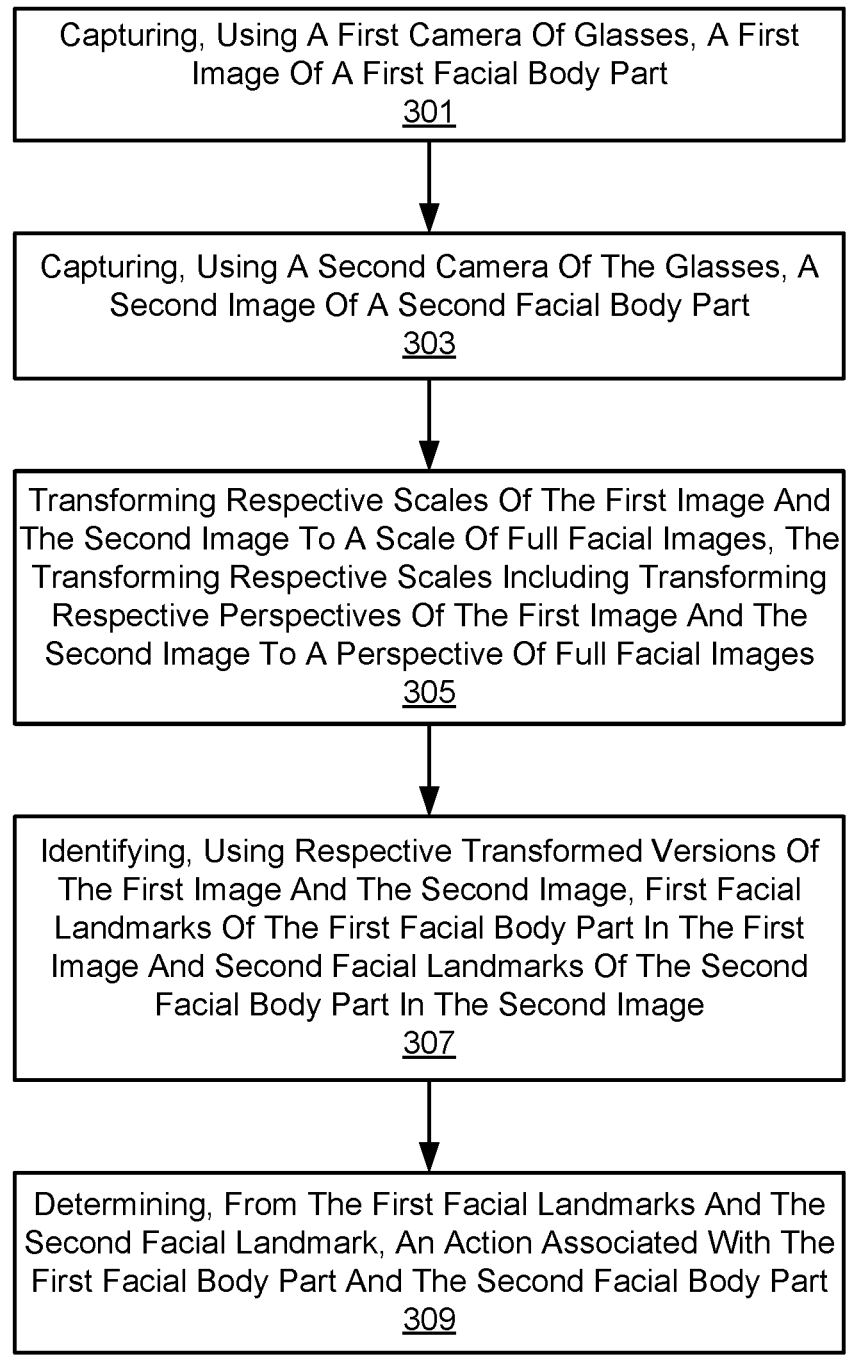
FIG. 3 is a flow diagram of an example method to implement two image facial detection.

Referring to FIG. 3, a flowchart of an example method 300 to implement two image facial detection is depicted. In order to assist in the explanation of method 300, it will be assumed that method 300 may be performed with the system 200, and at least partially by a computing device implementing the system 200 and/or a processor thereof. Indeed, the method 300 may be one way in which the system 200 may be configured. Furthermore, the following discussion of method 300 may lead to a further understanding of the system 200, and its various components. Furthermore, it is to be emphasized, that method 300 may not be performed in the exact sequence as shown, and various blocks may be performed in parallel rather than in sequence, or in a different sequence altogether. Furthermore, it is to be emphasized that the method 300 may alternatively be performed with the system 100, and at least partially by a computing device implementing the system 100 and/or a processor thereof Beginning at a block 301, a computing device captures, using a first camera 201 of the glasses 225, a first image of a first facial body part. In some examples, at the block 301, the computing device captures images of one eye (e.g. using one camera 201), while in other examples, at the block 301, the computing device captures images of two eyes (e.g. using two cameras 201)

At a block 303, the computing device captures, using the second camera 202 of the glasses 225, a second image of a second facial body part. In some examples, at the block 303, the computing device captures images of a mouth.

At a block 305, the computing device transforms respective scales of the first image and the second image to a scale of full facial images. As depicted, in some examples, the transforming respective scales may include transforming respective perspectives of the first image and the second image to a perspective of full facial images, as described above. Regardless, the block 303 may be implemented using a transformation matrix, as described above, which may be generated during implementation of the method 300 and/or which may have previously generated, prior to implementation of the method 300.

At a block 307, the computing device identifies, using respective transformed versions of the first image and the second image, first facial landmarks of the first facial body part in the first image and second facial landmarks of the second facial body part in the second image.

At a block 309, the computing device determines, from the first facial landmarks and the second facial landmark, an action associated with the first facial body part and the second facial body part.

In some examples, the method 300 may further comprise the computing device cropping the respective transformed versions of the first image and the second image, respectively, around the first facial body part and the second facial body part, respective cropped portions of the respective transformed versions of the first image and the second image used in the identifying (e.g. at the block 307) of the first facial landmarks and the second facial landmarks.

In some examples, the method 300 may further comprise the computing device, or another computing device: determining facial landmarks in the collection 241 of the full facial images acquired using at least a third camera; receiving manual indications of respective facial landmarks in the collection 242 of images of the first facial body part and the second facial body part, the respective facial landmarks corresponding to the facial landmarks of the first facial body part and the second facial body part in the full facial images; and comparing the facial landmarks and the respective facial landmarks to determine a transformation matrix therebetween. Hence, as described above, the transforming the respective scales of the first image and the second image to the scale of the full facial images, at the block 305, may occur using the transformation matrix. However, the transformation matrix may alternatively be generated prior to implementation of the method 300.

In some examples, the method 300 may further comprise the computing device: capturing, using a third camera, a third image of a third facial body part; transforming a respective scale of the third image to the scale of the full facial images; identifying, using a respective transformed version of the third image, third facial landmarks of the third facial body part in the third image; and determining, from the first facial landmarks, the second facial landmarks, and the third facial landmarks, the action associated with the first facial body part and the second facial body part, the action further associated with the third facial body part. Hence, for example, such an example may include using both of the first cameras 201 to capture images of both eyes of the user 226 such that three images of facial body parts (e.g. two images of respective eyes, and one image of a mouth) are used in the method 300. Alternatively, the glasses 225 may comprise a camera which captures images of another body part (e.g. eyebrows) which are used in the method 300, with an additional respective local location engine 220 provided for the images of the other body part.

Figure 4:
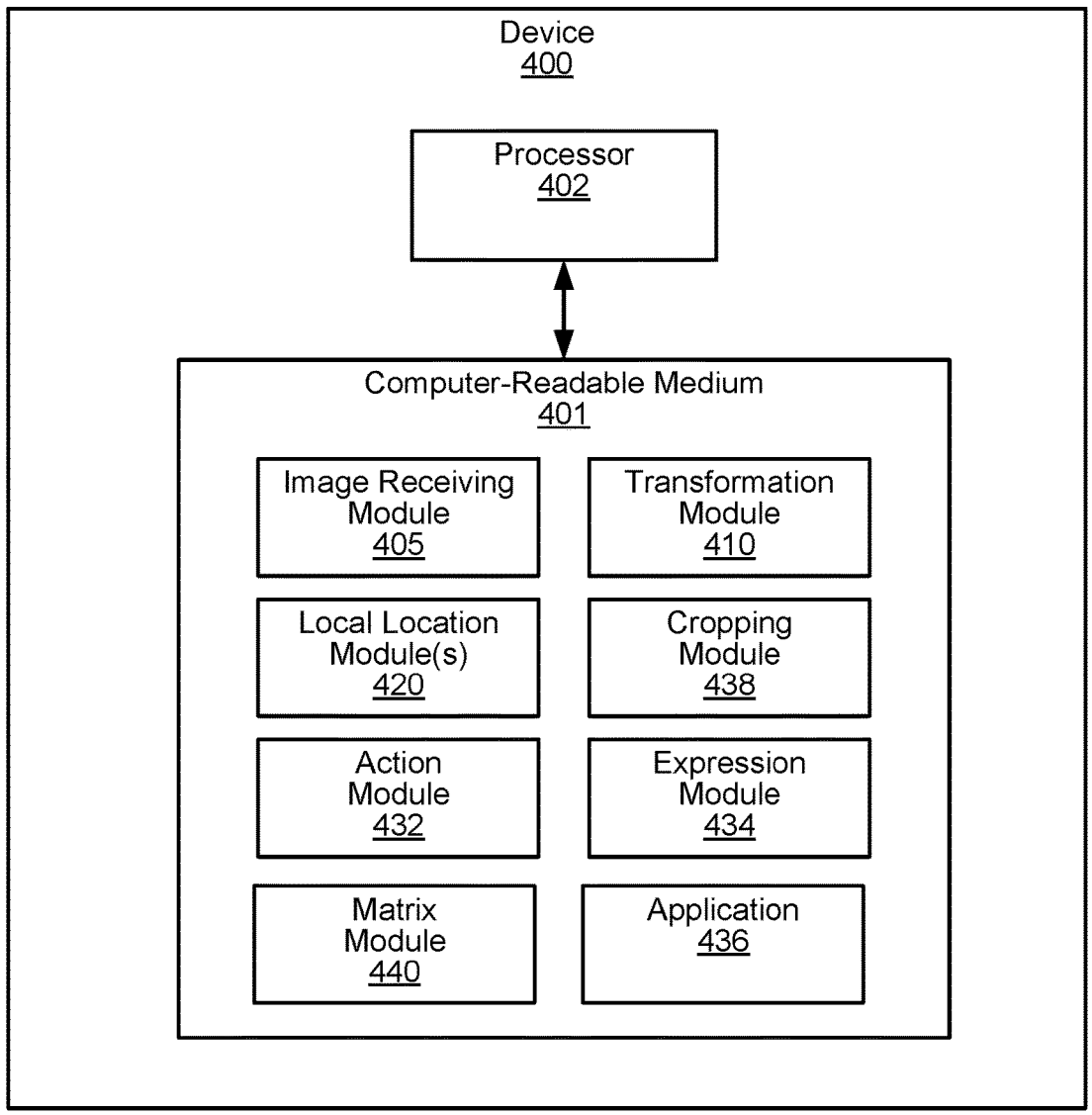
FIG. 4 is a block diagram of an example computer-readable medium including instructions that causes a processor to implement two image facial detection.

FIG. 4 is a block diagram of an example device 400 that includes a computer-readable medium 401 and a processor 402. The computer-readable medium 401 includes instructions that, when executed by the processor 402, cause the processor 402 to implement two image facial detection. The computer-readable medium 401 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 402 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc. The computer-readable medium 401 or the processor 402 may be distributed among a plurality of computer-readable media or a plurality of processors.

Furthermore, while not depicted, the device 400 may include the glasses 225 and/or a computing device of the glasses 225 and/or a computing device in communication with the glasses 225.

The computer-readable medium 401 may include an image receiving module 405. As used herein, a "module" (in some examples referred to as a "software module") is a set of instructions that when executed or interpreted by a processor or stored at a processor-readable medium realizes a component or performs a method. The image receiving module 405 may include instructions that, when executed, cause the processor 402 to capture, using a first camera, a first image of a first facial body part; and capture, using a second camera, a second image of a second facial body part. For example, the images may be received from the first cameras 201 and the second camera 202.

The computer-readable medium 401 may include a transformation module 410. The transformation module 410 may include instructions that, when executed, cause the processor 402 to transform respective scales of the first image and the second image to a scale of full facial images.

The computer-readable medium 401 may include a local location module 420 (and/or local location modules 420). The local location module 420 may include instructions that, when executed, cause the processor 402 to identify, using respective transformed versions of the first image and the second image, first facial landmarks of the first facial body part in the first image and second facial landmarks of the second facial body part in the second image.

The computer-readable medium 401 may include an action module 432 and/or an expression module 434. The action module 432 and/or the expression module 434 may include instructions that, when executed, cause the processor 402 to determine, from the first facial landmarks and the second facial landmarks, an emotion associated with the first facial body part and the second facial body part and/or control an application 436 being executed by the processor 402. For example, the instructions of the action module 432 and/or an expression module 434, when executed, may cause the processor 402 to determine, from the first facial landmarks and the second facial landmarks, the emotion by comparing first facial landmarks and the second facial landmarks to respective facial landmarks of a neutral face. In particular, action module 432 and/or the expression module 434 may include instructions that, when executed, cause the processor 402 to determine facial action units from the first facial landmarks and the second facial landmarks, and associated emotion.

As depicted the computer-readable medium 401 may include the application 436 which may include instructions that, when executed, cause the processor 402 to perform functionality defined by the application 436 according to a determined emotion.

The computer-readable medium 401 may include a cropping module 438. The cropping module 438 may include instructions that, when executed, cause the processor 402 to crop the respective transformed versions of the first image and the second image (e.g. as produced by the transformation module 410), respectively, around the first facial body part and the second facial body part, respective cropped portions of the respective transformed versions first image and the second image used in the identifying of the first facial landmarks and the second facial landmarks (e.g. at the local location module 420).

The computer-readable medium 401 may include a matrix module 440. The matrix module 440 may include instructions that, when executed, cause the processor 402 to compare pre-determined facial landmarks in a collection of full facial images, acquired using at least a third camera, with corresponding pre-determined facial landmarks in a collection of images of the first facial body part and the second facial body part, acquired using a first camera and a second camera, to determine a transformation matrix therebetween; and transform the respective scales of the first image and the second image to the scale of the full facial images using the transformation matrix. As described above, the matrix module 440 may alternatively be at another computing device used, for example, to determine the transformation matrix; hence, the matrix module 440 may be optional at the computer-readable medium 401, and/or the transformation matrix may have been previously generated and made available to (and/or may have been provisioned at) the transformation module 410.

In any event, provided herein are devices, system and methods for implementing two image facial detection which may be used to determine emotion of user when images of portions of the face of the user are available.

It should be recognized that features and aspects of the various examples provided above may be combined into further examples that also fall within the scope of the present disclosure.

The invention claimed is:

1. A system comprising:
a first camera to capture a first image of a first facial body part, wherein the first image has a first scale;
a second camera to capture a second image of a second facial body part, wherein the second image has a second scale;
a transformation engine to transform the first scale of the first image to a third scale of full facial images, as a first transformed version of the first image, and the second scale of the second image to the third scale of full facial images, as a second transformed version of the second image, wherein the first scale and the second scale are different from the third scale; and
a local location engine to identify first facial landmarks in the first transformed version of the first image and second facial landmarks in the second transformed version of the second image, the first facial landmarks and the second facial landmarks used to determine that an action has occurred.

2. The system of claim 1, further comprising:
an expression engine to determine, based on the action determined from at least the first facial landmarks and the second facial landmarks, an emotion associated with the first facial body part and the second facial body part.

3. The system of claim 1, further comprising:
a cropping engine to crop the first transformed version of the first image around the first facial body part and crop the second transformed version of the second image around the second facial body part, respective cropped portions of the first transformed version of the first image and the second transformed version of the second image used by the local location engine to identify the first facial landmarks and the second facial landmarks.

4. The system of claim 1, further comprising:
an action engine to determine the action.

5. The system of claim 1, wherein the first camera and the second camera are components of glasses.

6. The system as claimed in claim 1, wherein, to transform the first scale of the first image and the second scale of the second image to the scale of full facial images, the transformation engine is to:
apply a transformation matrix to the first image to generate the first transformed version of the first image, and
apply the transformation matrix to the second image to generate the second transformed version of the second image.

7. The system of claim 6, wherein the transformation matrix comprises a matrix of values and, to apply the transformation matrix to the first image, the transformation engine multiplies the matrix of values by pixel values of the first image.

8. The system of claim 6, wherein the transformation matrix comprises a first matrix of values for application to the first image and a second matrix of values for application to the second image.

9. The system of claim 1, wherein the scale of full facial images comprises a scale of a normalized facial image of a prespecified face size with facial parts at prespecified locations.

10. A method comprising:
capturing, using a first camera of glasses, a first image, at a first scale, of a first facial body part;
capturing, using a second camera of the glasses, a second image, at a second scale, of a second facial body part;
transforming respective scales of the first image and the second image to a scale of full facial images, the transforming respective scales including transforming respective perspectives of the first image and the second image to a perspective of full facial images, the transforming respective scales includes changing the first scale of the first image to the scale of full facial images and changing the second scale of the second image to the scale of full facial images;
after transforming the respective scales of the first image and the second image, identifying, using respective transformed versions of the first image and the second image, first facial landmarks of the first facial body part in the transformed version of the first image in the scale of full facial images and second facial landmarks of the second facial body part in the transformed version of the second image in the scale of full facial images; and
determining, from the first facial landmarks and the second facial landmark, an action associated with the first facial body part and the second facial body part.

11. The method of claim 10, further comprising:
cropping the respective transformed versions of the first image and the second image, respectively, around the first facial body part and the second facial body part, respective cropped portions of the respective transformed versions of the first image and the second image used in the identifying of the first facial landmarks and the second facial landmarks.

12. The method of claim 10, further comprising:
determining facial landmarks in a collection of the full facial images acquired using at least a third camera;
receiving manual indications of respective facial landmarks in a collection of images of the first facial body part and the second facial body part, the respective facial landmarks corresponding to the facial landmarks of the first facial body part and the second facial body part in the full facial images;
comparing the facial landmarks and the respective facial landmarks to determine a transformation matrix therebetween; and
transforming the respective scales of the first image and the second image to the scale of the full facial images using the transformation matrix.

13. The method of claim 10, further comprising capturing, using a third camera, a third image of a third facial body part;
transforming a respective scale of the third image to the scale of the full facial images;
identifying, using a respective transformed version of the third image, third facial landmarks of the third facial body part in the third image; and
determining, from the first facial landmarks, the second facial landmarks, and the third facial landmarks, the action associated with the first facial body part and the second facial body part, the action further associated with the third facial body part.

14. The method of claim 10, wherein the first facial body part comprises a mouth, and the second facial body part comprises an eye.

15. A non-transitory computer-readable medium comprising instructions that, when executed by a processor, cause the processor to:
capture, using a first camera, a first image of a first facial body part;
capture, using a second camera, a second image of a second facial body part;
transform, using a transformation engine, respective scales of the first image and the second image to a scale of full facial images, the transformation engine to:
apply a transformation matrix to the first image to generate a transformed version of the first image at the scale of full facial images, and
apply the transformation matrix to the second image to generate a transformed version of the second image at the scale of full facial images;
identify, using respective transformed versions of the first image and the second image, first facial landmarks of the first facial body part in the transformed version of the first image and second facial landmarks of the second facial body part in the transformed version of the second image; and
determine, from the first facial landmarks and the second facial landmarks, an emotion associated with the first facial body part and the second facial body part.

16. The non-transitory computer-readable medium of claim 15, wherein the instructions, when executed, further cause the processor to:
crop the respective transformed versions of the first image and the second image, respectively, around the first facial body part and the second facial body part, respective cropped portions of the respective transformed versions of the first image and the second image used to identify the first facial landmarks and the second facial landmarks.

17. The non-transitory computer-readable medium of claim 15, wherein the instructions, when executed, further cause the processor to:
compare pre-determined facial landmarks in a collection of the full facial images, acquired using at least a third camera, with corresponding pre-determined facial landmarks in a collection of images of the first facial body part and the second facial body part, acquired using the first camera and the second camera, to determine the transformation matrix therebetween.

18. The non-transitory computer-readable medium of claim 15, wherein the instructions, when executed, further cause the processor to:
   control an application being executed by the processor using the emotion.

19. The non-transitory computer-readable medium of claim 15, wherein the instructions, when executed, further cause the processor to:
   determine, from the first facial landmarks and the second facial landmarks, the emotion by comparing first facial landmarks and the second facial landmarks to respective facial landmarks of a neutral face.

* * * * *